US009118240B2

(12) United States Patent
Lanni (10) Patent No.: US 9,118,240 B2
(45) Date of Patent: Aug. 25, 2015

(54) POWER SUPPLY EQUIPMENT PROVIDING MULTIPLE IDENTIFICATION SIGNALS

(75) Inventor: Thomas W. Lanni, Laguna Niguel, CA (US)

(73) Assignee: Comarco Wireless Technologies, Inc., Lake Forest, CA (US)

( * ) Notice: Subject to any disclaimer, the term of this patent is extended or adjusted under 35 U.S.C. 154(b) by 589 days.

(21) Appl. No.: 13/222,496

(22) Filed: Aug. 31, 2011

(65) Prior Publication Data
US 2013/0049487 A1 Feb. 28, 2013

(51) Int. Cl.
| G05F 3/06 | (2006.01) |
| H02M 1/10 | (2006.01) |
| H02J 7/00 | (2006.01) |
| H02M 3/00 | (2006.01) |

(52) U.S. Cl.
CPC .............. *H02M 1/10* (2013.01); *H02J 7/0004* (2013.01); *H02J 7/0055* (2013.01); *H02J 2007/0001* (2013.01); *H02M 3/00* (2013.01)

(58) Field of Classification Search
CPC ......... H02M 1/10; H02M 3/00; H02J 7/0055; H02J 7/0004; H02J 2007/0001
USPC ......................................................... 307/151
See application file for complete search history.

(56) References Cited

U.S. PATENT DOCUMENTS

| 5,164,652 A | 11/1992 | Johnson et al. |
| 5,254,931 A | 10/1993 | Martensson |
| 5,333,177 A | 7/1994 | Braitberg et al. |
| 5,350,993 A | 9/1994 | Toya et al. |
| 5,369,352 A | 11/1994 | Toepfer et al. |
| 5,420,496 A | 5/1995 | Ishikawa |
| 5,506,490 A | 4/1996 | DeMuro |
| 5,534,765 A | 7/1996 | Kreisinger et al. |
| 5,570,002 A | 10/1996 | Castleman |
| 5,573,425 A | 11/1996 | Morisawa et al. |
| 5,593,323 A | 1/1997 | Dernehl |
| 5,615,344 A | 3/1997 | Corder |
| 5,694,024 A | 12/1997 | Dias et al. |

(Continued)

FOREIGN PATENT DOCUMENTS

| WO | WO 98/19223 | 5/1998 |
| WO | WO 2006/116298 A1 | 11/2006 |

OTHER PUBLICATIONS

European Search Report dated Sep. 19, 2006 for EP Patent Application No. EP05250133.5, 3 pages.

(Continued)

*Primary Examiner* — Daniel Cavallari
(74) *Attorney, Agent, or Firm* — Ethan R. Fitzpatrick (57) ABSTRACT

Power supply equipment is provided for supplying an appropriate power adapter identification signal, as well as DC power, to various types, brand and models of electronic devices. The equipment includes a power adapter having conversion circuitry for converting power from an external power source to the DC power utilized by a particular electronic device. The power adapter also includes circuitry to generate a plurality of power adapter identification signals. Selection circuitry, responsive to user selection or to the configuration of a cable, connector or connector adapter included with the power supply equipment, selects a particular one of power adapter identification signals appropriate for the particular electronic device. The selected power adapter identification signal and the DC power are transferred to the power input port of the electronic device.

6 Claims, 5 Drawing Sheets

(56) References Cited

U.S. PATENT DOCUMENTS

| | | | |
|---|---|---|---|
| 5,703,467 | A | 12/1997 | Patino |
| 5,783,927 | A | 7/1998 | Chen |
| 5,836,783 | A | 11/1998 | Morisawa et al. |
| 5,861,729 | A | 1/1999 | Maeda et al. |
| 5,912,544 | A | 6/1999 | Miyakawa et al. |
| 5,939,856 | A | 8/1999 | Demuro et al. |
| 5,955,797 | A | 9/1999 | Kim |
| 5,969,438 | A | 10/1999 | Odaohara |
| 6,054,846 | A | 4/2000 | Castleman |
| 6,288,522 | B1 | 9/2001 | Odaohhara et al. |
| 6,358,096 | B1 | 3/2002 | Beckman |
| 6,360,177 | B1 | 3/2002 | Curt et al. |
| 6,368,155 | B1 | 4/2002 | Bassler et al. |
| 6,459,175 | B1 | 10/2002 | Potega |
| 6,528,970 | B1 | 3/2003 | Liu et al. |
| 6,597,565 | B1 | 7/2003 | Kluth et al. |
| 6,628,535 | B1 | 9/2003 | Wu |
| 6,751,109 | B2 | 6/2004 | Doss et al. |
| 6,795,302 | B2 | 9/2004 | Kluth et al. |
| 6,903,950 | B2 | 6/2005 | Afzal et al. |
| 6,999,505 | B2 | 2/2006 | Yokoo et al. |
| RE39,036 | E | 3/2006 | Castleman |
| 7,028,202 | B2 | 4/2006 | Long et al. |
| 7,039,821 | B1 | 5/2006 | Potega |
| 7,058,484 | B1* | 6/2006 | Potega .......... 700/297 |
| 7,127,623 | B2* | 10/2006 | Potega .......... 713/300 |
| 7,145,312 | B2 | 12/2006 | Lanni |
| 7,166,937 | B2* | 1/2007 | Wilson et al. .......... 307/151 |
| 7,392,410 | B2 | 6/2008 | Allen |
| 7,453,171 | B2* | 11/2008 | Lanni .......... 307/151 |
| 7,868,486 | B2 | 1/2011 | Lanni |
| 7,937,603 | B2 | 5/2011 | Haberle et al. |
| 7,999,412 | B2 | 8/2011 | Lanni |
| 8,296,587 | B2* | 10/2012 | Paniagua et al. .......... 713/300 |
| 8,330,303 | B2 | 12/2012 | Lanni |
| 2002/0171980 | A1 | 11/2002 | Tsukihashi |
| 2003/0207603 | A1 | 11/2003 | Potega |
| 2003/0222503 | A1 | 12/2003 | Lam et al. |
| 2004/0018774 | A1 | 1/2004 | Long et al. |
| 2004/0075419 | A1 | 4/2004 | Massey et al. |
| 2004/0108833 | A1* | 6/2004 | Lanni .......... 320/116 |
| 2004/0108843 | A1* | 6/2004 | Lanni .......... 323/271 |
| 2005/0127758 | A1 | 6/2005 | Atkinson et al. |
| 2005/0162020 | A1 | 7/2005 | Lanni |
| 2006/0098358 | A1* | 5/2006 | Wambsganss et al. .......... 361/18 |
| 2006/0164061 | A1 | 7/2006 | Formenti et al. |
| 2006/0174143 | A1 | 8/2006 | Sawyers et al. |
| 2006/0220465 | A1 | 10/2006 | Kingsmore et al. |
| 2007/0073420 | A1* | 3/2007 | Lanni .......... 700/22 |
| 2007/0230227 | A1* | 10/2007 | Palmer .......... 363/78 |
| 2011/0095605 | A1 | 4/2011 | Lanni |

OTHER PUBLICATIONS

European Search Report dated Nov. 24, 2008 for EP Patent Application No. 07254497.6, 13 pages.
European Search Report dated Sep. 28, 2006 for EP Patent Application No. EP05250133.5, 3 pages.
European Search Report dated Feb. 6, 2009 for EP Patent Application No. 07254497.6, 13 pages.
European Patent Office, "Examination Report/Communication Pursuant to Article 94(3) EPC" re: Patent Application Serial No. 05 250 133.5, Date: Jun. 14, 2012, 11 pages.
National Semiconductor Corporation, "Datasheet for LM2601 Adapter Interface Circuit", dated Apr. 2001, 6 pages.
Radio Shack 1990 Catalog, cover page and p. 151, 1990.
Radio Shack 1994 Catalog, cover page and p. 142, 1994.
Radio Shack 1995 Catalog, cover page and pp. 150-151, 1995.
Minwa Products, "MW182", Minwa Products Catalog 1993, 1 page.
Power Stream Technology, "High Quality Automobile to Laptop DC/DC Converter" Specification sheet copyright 2000, 2002, 2003, 2004—4 pages.
*ACCO Brands USA LLC* vs. *Comarco Wireless Technologies, Inc.*, Case No. C11-4378 R.S, U. S. District Court for the Northern District of California, Plaintiff and Counterdefendant ACCO's Invalidity Contentions, pp. 1-3 and Exhibit E, pp. 1-6, Jun. 27, 2012.
"Universal Serial Bus Specification Revision 2.0" Compaq Computer Corporation, et al., Apr. 27, 2000, Cover page, Copyright notice page, Content pp. v-xiii, Section 7.2 Power Distribution, pp. 171-178.
Declaration of Thomas W. Lanni Regarding Comarco N19 and N24 Tips, May 14, 2013, 2 pages.
Comarco Wireless Technologies, Inc. Specification Control Drawing No. 1910-0219, "Tip N19", May 14, 2004, 5 pages.
Comarco Wireless Technologies, Inc. Specification Control Drawing No. 1245-0021-T, "EPROM DS2502, To-92", Jun. 21, 2005, 1 page.
Comarco Wireless Technologies, Inc. Specification Control Drawing No. 1910-0224, "Tip N24", Oct. 23, 2004, 5 pages.
Case No. C11-4378-RS, Patent L.R. 4-3 Joint Claim Construction and Prehearing Statement, Pacer Document No. 33, Aug. 31, 2012, 26 pages.
Case No. C11-4378-RS, Comarco Wireless Technologies, Inc.'s Patent L.R. 4-5(a) Opening Claim Construction Brief, Pacer Document No. 36, Sep. 21, 2012, 33 pages.
Case No. C11-4378-RS, Plaintiff ACCO Brands USA LLC's Opening Markman Brief, Pacer Document No. 38, Oct. 12, 2012, 31 pages.
Case No. C11-4378-RS, Comarco Wireless Technologies, Inc.'s Memorandum of Points and Authorities in Opposition to Plaintiff's Motion to Strike the Declaration of Thomas W. Lanni, Pacer Document No. 40, Oct. 26, 2012, 16 pages.
Case No. C11-4378-RS, ACCO Brands USA LLC's Reply in Support of Motion to Strike the Declaration of Thomas W. Lanni, Pacer Document No. 41, Nov. 2, 2012, 17 pages.
Case No. C11-4378-RS, Comarco Wireless Technologies, Inc.'s Patent L.R. 4-5(c) Claim Construction Reply Brief, Pacer Document No. 42, Nov. 2, 2012, 18 pages.
Case No. C11-4378-RS, Claim Construction Order, Pacer Document No. 49, Mar. 6, 2013, 23 pages.

\* cited by examiner

POWER SUPPLY EQUIPMENT PROVIDING MULTIPLE IDENTIFICATION SIGNALS

BACKGROUND OF THE INVENTION

1. Technical Field

The present invention relates to power supplies, also known as power adapters and power converters. In particular, the invention concerns power supply equipment, including power adapters, cables, connectors and connector adapters (tips) which can provide an appropriate adapter identification signal, as well as DC power, to various types, brands and models of electronic devices.

2. Description of the Related Arts

Power adapters used to provide DC power to portable electronic devices, such as notebook computers, cellular telephones, PDAs, MP3 players and the like, are available to end users from two general sources. On the one hand, electronic device manufacturers often include a power adapter with the purchase of an electronic device. Such power adapters are typically configured to power only the corresponding type, brand and model of electronic device. On the other hand, companies specializing in power adapters often sell universal power adapters and associated equipment which can be utilized to power a variety of types, brands and models of electronic devices. U.S. Pat. No. 6,693,413 describes power adapter circuitry, cables, connectors and connector adapters (tips) used to provide the voltage, current and mechanical interface appropriate for a variety of electronic devices.

For reasons including device power management, some electronic devices require the reception of a data or identification signal, in addition to DC power, from a power adapter. Such signal may provide to the electronic device information such as an adapter manufacturer name or code, an adapter power rating and/or an adapter current rating. For example, the signal may be a character string (of logical "1s" and "0s") which encodes the message, "Manufacturer A, 90 Watts". Based on the presence of the identification signal, the electronic device recognizes that it is coupled to a compatible power adapter. Dependent on the power rating value, the electronic device may enable or disable certain functions. For example, the device may enable battery charging circuitry in response to a power rating value of 90 W or more, but disable battery charging in response to a power rating value of less than 90 W (see U.S. Pat. No. 7,868,486).

With respect to universal power adapters utilizing a variety of connector adapters (tips) to mechanically interface with a variety of electronic devices, U.S. Pat. No. 7,999,412 discloses placement of circuitry within the various tips to generate the data signal expected by a corresponding type, brand and model of electronic device. Placing the data signal generation circuitry within the tips has a cost disadvantage in that the circuitry must be included in each of the individual tips to be used for interfacing with an electronic device expecting a data signal. The cost factor impacts any such tips needed to replace lost or damaged tips, as well as such tips originally sold with the adapter.

SUMMARY OF THE INVENTION

The present invention concerns power supply equipment which can provide an appropriate power adapter identification signal, as well as DC power, to various types, brands and models of electronic devices. In addition to conversion circuitry for generating a DC output voltage, a power adapter includes circuitry for generating a plurality of power identification signals. By the configuration of a cable, connector or connector adapter included with the power supply equipment, or by user selection, one of the plurality of power adapter identification signals is selected. The selected power adapter identification signal and the DC power are transferred to the power input port of the electronic device.

In one aspect of the invention, the plurality of power adapter identification signals are received on the input side of a connector adapter, but only a selected one of the signals is output to the electronic device. The selection may be made by an electrical configuration of the connector adapter or by user control of a multiple position switch included on the connector adapter. In another aspect of the invention, only one of the plurality power adapter identification signals generated within the power adapter is output from the power adapter. Determination of which signal is output may be made by a configuration of a cable, connector or connector adapter electrically coupled to the power adapter, or by user control of a multiple position switch included on the power adapter.

DETAILED DESCRIPTION

Figure 1:
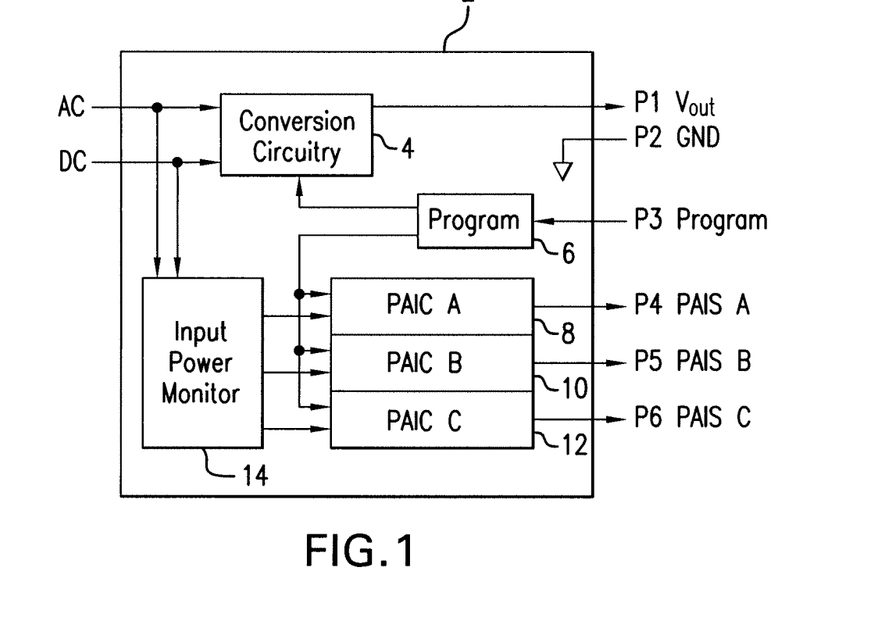
FIG. 1 is a block diagram of an adapter according to an embodiment of the invention.

Referring to FIG. 1, there is shown a power adapter 2 used to provide DC power to a portable electronic device, such as a notebook computer, cellular telephone, PDA, MP3 player, etc. The power adapter is capable of receiving an input voltage from a DC power source, such as an automobile or airplane power port, as well as from an AC power source, such as a household wall outlet. Conversion circuitry 4 converts the input voltage to a DC output voltage $V_{out}$ which is provided to the electronic device. If the power adapter is intended for use only with electronic devices which all require the same input voltage, the output voltage may be fixed to such value. Alternatively, programming signal(s) may be used by a program circuit 6 to control the conversion circuitry 4 to provide a particular voltage and/or current selectable from a range of output voltages and/or currents. The program signal(s) may originate from a switch(es) (not shown) mounted on the adapter 2 or from switches/circuits external to the adapter.

The power adapter 2 includes circuitry to generate a plurality of power adapter identification signals ("PAICs"). In FIG. 1, three power adapter identification circuits ("PAICs"), PAIC A 8, PAIC B 10 and PAIC C 12 are illustrated as respectively generating power adapter identification signals, PAIS A, PAIS B and PAIS C. Each PAIC is configured to generate a power adapter identification signal suitable for at least one type, brand or model of electronic device. In an embodiment of the invention, each of the PAICs produce at least one PAIS which is expected to be received by one or more electronic devices with which the adapter 2 is compatible. Such compatibility may be conveyed by having the PAIS comprise a character string which includes a phrase, such as "MANUFACTURER A." Alternatively, such compatibility may be conveyed by having the PAIS be in the format expected by the electronic device. The format may concern one or more of signal type (e.g., time varying or DC), signal magnitude/magnitude range (e.g., of voltage and/or current) or other parameters (e.g., wave shape, frequency, etc.).

In a preferred embodiment, a particular PAIS indicates a power rating of the adapter 2. The power rating information may be conveyed by having the PAIS comprise a character string which includes a phrase, such as "120 Watts" or "7.5 Amperes." Alternatively, the power rating may be conveyed by a magnitude and/or other parameter of the PAIS. The power rating information conveyed by a PAIS may be a set value dependent only on the specifications of the adapter. For example, an adapter specification rated at 120 Watts produces a PAIS indicative of such 120 Watts value.

In an embodiment of the invention in which the magnitude of the output voltage $V_{out}$ can be set and/or the magnitude of the output current can be limited to particular values by a programming signal(s), the programming circuit 6 may control one or more PAICs 8, 10, 12 to produce a corresponding PAIS. For example, if current programming sets the adapter current limit to 5 A and the adapter is producing 16 V (either as a fixed or programmed voltage), one or more of the PAISs indicates an adapter power rating of 80 W. Additionally, an input power monitor circuit 14 may monitor parameters of the AC or DC input power in relation to a reference value(s) to control one or more PAICs to produce a PAIS dependent on the monitored parameters. The monitor circuit 14 may provide supplementary or override control of a PAIC relative to preset or programmed power rating signal generation.

Figure 2A:
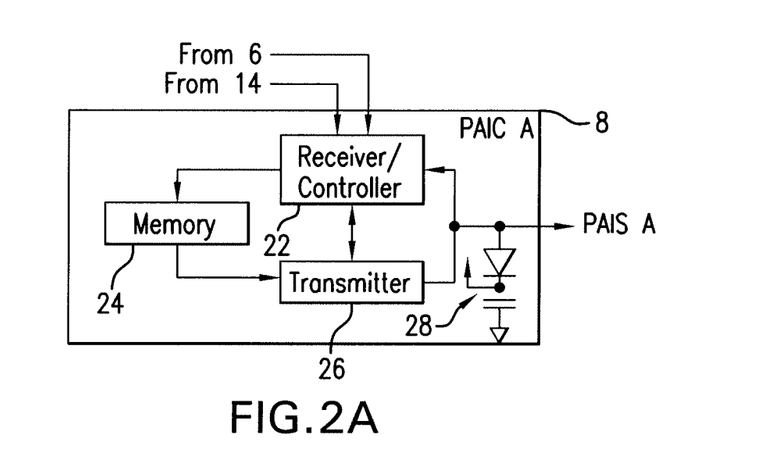
FIG. 2A is a block diagram of a power adapter identification circuit which generates a character string-type power adapter identification signal.

FIG. 2A illustrates a block diagram of PAIC A 8. The components of PAIC A include a receiver/controller 22, a memory 24 and a transmitter 26. In one embodiment, PAIC A communicates with an electronic device via the so-called 1-Wire protocol, in which data between the PAIC A and the electronic device is transferred serially over a single line (and ground, GND). A parasitic power circuit 28 may be used to derive power from the signals sent by the electronic device to power the PAIC A, but such power may be derived from $V_{out}$ via standard regulator circuitry (not shown). The memory 24 is preferably an EPROM or EEPROM, but other non-volatile memory types are acceptable. Prior to sale of the adapter, the memory 24 is programmed to generate at least one character string which can be sent to the electronic device via PAIS A.

In one embodiment, the electronic device sends an interrogation request to the PAIC A. In response, the receiver/controller 22 provides address, timing and control signals to the memory 24 and the transmitter 26 so that an appropriate character string is read from the memory and sent to the electronic device by the transmitter 26. In one embodiment of the invention, the portion of the memory addressed by the receiver/controller 22 is invariably predefined so that a correspondingly predefined character string is sent to the electronic device. For a power adapter specification-rated at 120 W, the character string may include the message "MANUFACTURER A, 120 Watts." In other embodiments, the portion of the memory addressed in response to an interrogation request is dependent on one or both of the control signals provided to the receiver/controller 22 by the program circuitry 6 and/or the input power monitor circuitry 14. Accordingly, a power rating value included in PAIS A may be indicative of the amount of power actually currently available from the power adapter 2, rather than a specification power rating.

In some embodiments, an interrogation request from the electronic device is not utilized and block 22 acts merely as a controller to repeatedly send to the electronic device an appropriate PAIS. Such PAIS may be sent as long as the adapter is receiving external power, or for a defined time period after initial power-up. In one embodiment, PAIC A may comprise a single integrated circuit chip such as a Dallas Semiconductor DS2502 chip. However, other circuitry, such as a general purpose controller or discrete circuits may be utilized to provide the functions of PAIC A.

Figure 2B:
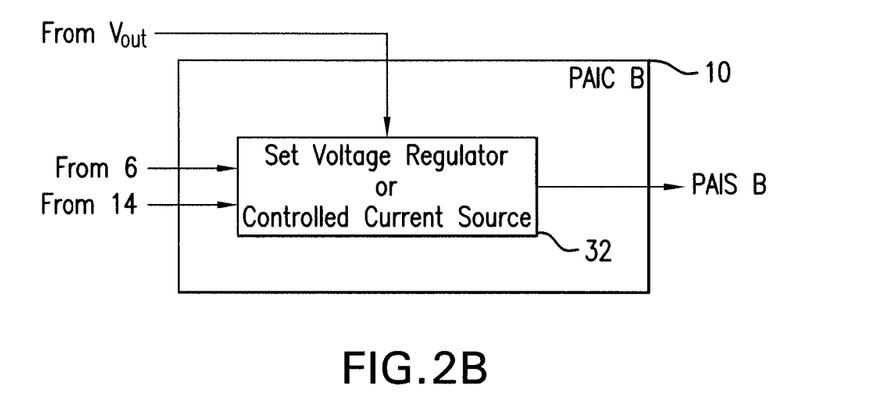
FIG. 2B is a block diagram of a power adapter identification circuit which generates a DC-type power adapter identification signal.

FIG. 2B is a block diagram of PAIC B 10. The PAIS B expected by the electronic device corresponding to PAIC B is a DC signal. An attribute of the DC signal is measured by the electronic device, for example by comparison to a reference value(s). Based on the measured magnitude of the signal, the electronic device recognizes the adapter and may determine that the adapter has a certain power rating. For example, a DC signal having a voltage amplitude of 1 V corresponds to a 80 W power rating, while a voltage amplitude of 3 V corresponds to a 120 W power rating. In this example, signal generator block 32 is a set voltage regulator which receives an input voltage from $V_{out}$ or another suitable voltage. The regulator output voltage value may be invariably set. Alternatively, in the case of programming, the regulator output voltage may be set to one of a plurality of values dependent on the programming circuitry 6. The input power monitor circuitry 14 may also be used to set the regulator output voltage to one of a plurality of values. Instead of voltage, the attribute of the DC signal relevant to the electronic device may be a current, in which case the signal generator 32 is a (controlled) current source, rather than a voltage regulator.

Figure 2C:
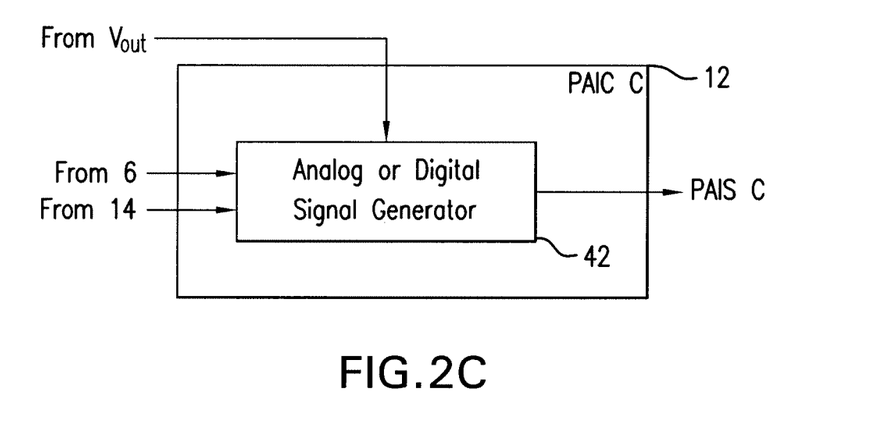
FIG. 2C is a block diagram of a power adapter identification circuit which generates a time varying-type power adapter identification signal.

FIG. 2C is a block diagram of PAIC C 12. The PAIS C expected by the electronic device corresponding to PAIC C is a time-varying signal. One or more attributes of the AC signal are measured by the electronic device, for example by comparison to known signals or to defined data content. Based on the determined attributes (e.g., signal type, amplitude, frequency and/or data content) of the PAIS C, the electronic device recognizes the power adapter and may determine that the adapter has a certain power rating. The PAIS C produced by the signal generator 42 may be an analog or digital signal which is invariably produced. Alternatively, in the case of programming, one or more of the signal's attributes may be controlled by the programming circuitry 6. The input power monitor circuitry 14 may also be used to control one or more of the signal's attributes.

Figure 3A:
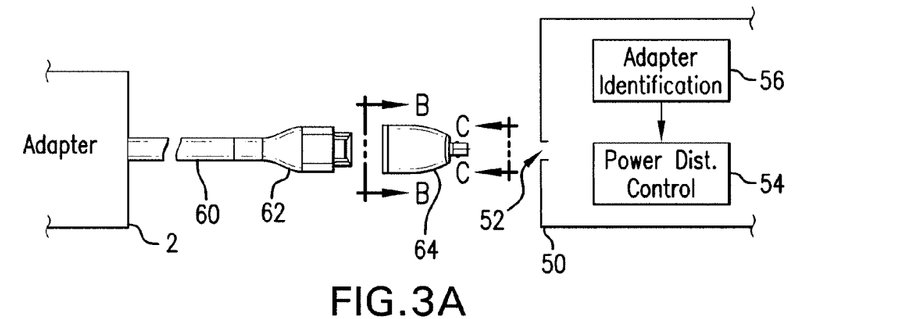
FIG. 3A is a diagram illustrating an electronic device coupled to a power adapter by the use of a cable and a connector adapter (tip)

FIG. 3A is a diagram showing connection of the adapter to an electronic device. In the figure, the adapter 2 and the electronic device 50 are illustrated in block diagram form, and a cable 60, a connector 62 and a connector adapter (tip) 64 are pictorially represented. Illustratively, the cable has six wires, each of which is connected to a corresponding one of the connection points P1-P6 identified in FIG. 1. The connector 62 is affixed to the distal end of the cable 60 and has six pins or connection points corresponding to each of the six wires in the cable 60. The connector adapter 64 detachably mates at one of its ends to the connector 62 and at the other end to the power input port 52 of the electronic device 50. The electronic device 50 includes adapter identification circuitry 56 which receives a power adapter identification signal from the adapter and communicates with power distribution control circuitry 54 within the electronic device 50.

Figure 3B:
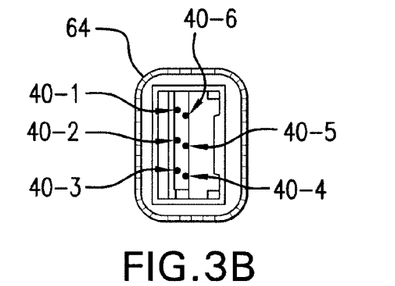
FIG. 3B is an end view of the connector adapter taken along the line B-B of FIG. 3A.
Figure 3C:
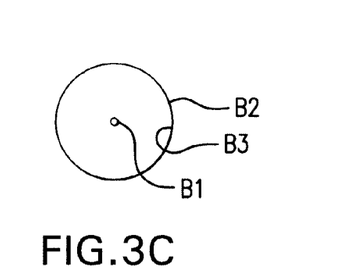
FIG. 3C is an end view of the barrel portion of the connector adapter taken along the line C-C of FIG. 3A.

FIG. 3B is an end view of the connector adapter 64 taken along the line B-B of FIG. 3A. The connector adapter has six connection points or pins 40-1 to 40-6 which engage with the corresponding pins or connection points on connector 62. FIG. 3C is an end view of a barrel portion of the connector adapter 64 taken along the line C-C of FIG. 3A. The barrel portion has a conductive center pin B1, a conductive outer sleeve B2 and a conductive inner sleeve B3, each of which conductively mates with a corresponding connection point of the power port 52 of electronic device 50. In practice, an adapter 2 is often provided to an end user along with a plurality of tips 64. The first end of all such tips have the configuration shown in FIG. 3B for detachably mating with the connector 62. However, the ends of the tips which interface with the input port 52 may differ in size, shape and pin assignment (pin out) so that each tip is suited for mechanically and electrically interfacing with a particular (type/brand/model(s) of an) electronic device. Such interface is not limited to a barrel connector, but is defined by the mechanical and electrical attributes of the power input port of various electronic devices to which the adapter 2 is to provide power.

Figure 4A:
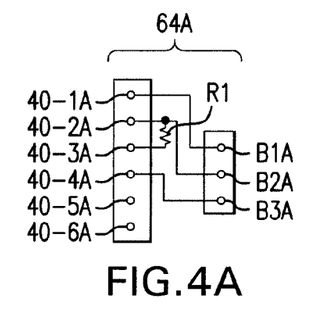
FIG. 4A-4C are schematic diagrams which illustrate wiring arrangements within three respective connector adapters.
Figure 4B:
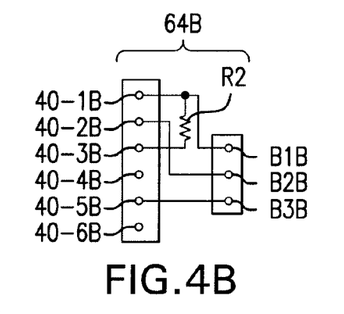
Figure 4C:
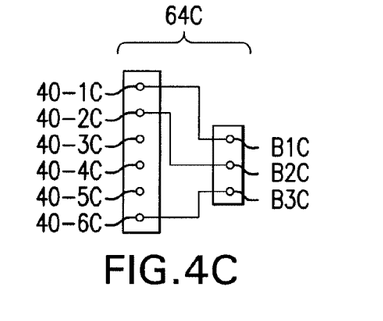

FIG. 4A-4C schematically illustrate the wiring arrangements within three connector adapters (tips) 64A, 64B and 64C. A particular tip is used to route an appropriate power adapter indication signal (PAIS) to a corresponding electronic device. The tip 64A of FIG. 4A is for use with an electronic device which expects to receive the character string-type PAIS A produced by the PAIC A 8 of FIGS. 1 and 2A. As shown by FIG. 4A, corresponding conductors (which may be wires or circuit traces) within tip 64A connect $V_{out}$ (received at pin 40-1A) to pin B1A, GND (received at pin 40-2A) to pin B2A and the PAIS A (received at pin 40-4A) to pin B3A. Within the electronic device, the connection point which interfaces with pin B3A routes the PAIS A to the adapter identification circuitry 56.

While the adapter produces the signals PAIS B and PAIS C and such signals are respectively received at pins 40-5A and 40-6A of the tip 64A, there is no connection of such pins to any of pins B1A-B3A and therefore no connection to the electronic device. In tip 64A, pins 40-5A and 40-6A may be coupled to ground by respective resistors (not shown) to limit noise generated by the signals PAIS B and PAIS C. A resistor R1 shown in FIG. 4A may be used for remote voltage or current programming and could therefore impact the content of PAIS A as explained in connection with FIGS. 1 and 2A.

The tip 64B of FIG. 4B is for use with an electronic device which utilizes the PAIS B produced by the PAIC B 10 of FIGS. 1 and 2B. As shown by FIG. 4B, corresponding conductors within the tip 64 connect $V_{out}$ to pin B1B, GND to pin B2B and the PAIS B (received at pin 40-5B) to pin B3B. Pins 40-4B and 40-6B have no connection within the tip 64B and may be coupled to ground via respective resistors (not shown). The resistor R2 shown in FIG. 4B may be used for voltage or current programming of $V_{out}$. The tip 64C of FIG. 4C is for use with an electronic device which expects to receive the PAIS C produced by the PAIC C 12 of FIGS. 1 and 2C. As shown by FIG. 4C, corresponding conductors within the tip 64C connect $V_{out}$ to pin B1C, GND to pin B2C and the PAIS C (received at pin 40-6C) to pin B3C. Pins 40-4C and 40-5C have no connection within the tip 64C and may be coupled to ground via respective resistors (not shown).

Referring again to FIG. 3A, the proximal end of the cable 60 is shown as being permanently connected to the adapter 2. However, this end of the cable may be affixed with a connector which detachably mates with a corresponding connector housed at the edge of the adapter in the same fashion that the connector 62 detachably mates with the connector adapter 64. Furthermore, an alternative embodiment of the invention may use a plurality of cables, each of which has at its proximal end a connector which detachably mates with the adapter 2 connector, and is affixed at its distal end with a connector (e.g., a barrel connector) corresponding to a particular (type/brand/model(s) of an) electronic device. In such embodiment, wiring arrangements as depicted in FIGS. 4A-4C are made at the location where the proximal end connector is connected to the cable. Such embodiment requires the assembly of several cables, but each cable need have only three wires (in the absence of programming). Alternatively, such wiring arrangements may be implemented at the distal end of the cable or within the cable itself.

Figure 5:
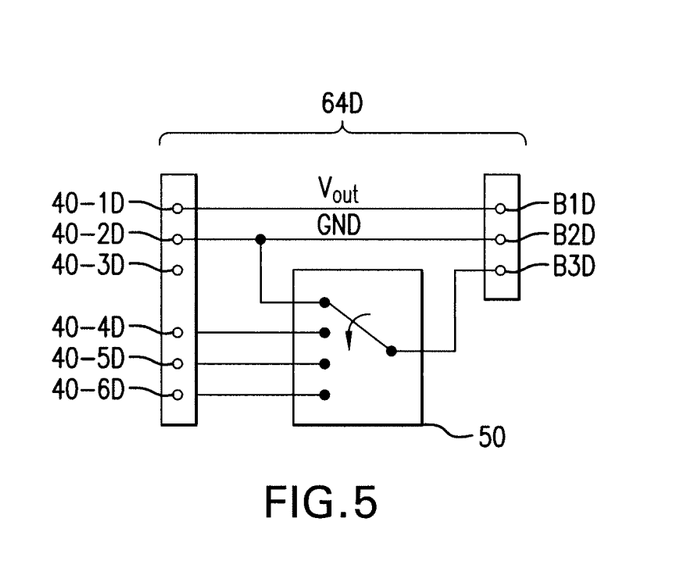
FIG. 5 is a schematic diagram of a connector adapter according to an embodiment of the invention.

FIG. 5 is a schematic diagram of a tip 64D according to an alternative embodiment of the invention. Power, i.e., $V_{out}$ and ground (GND), and signals PAIS A, PAIS B and PAIS C are transmitted from the adapter 2 to the tip 64D via the cable 60 as previously described. Respective conductors transfer $V_{out}$ and GND to center conductor B1D and the outer sleeve B2D of the barrel connector (or other type of output connector having a size and shape suitable to mate with the input power port of a particular electronic device). Power adapter identification signals PAIS A-PAIS C are received at input pins 40-4D to 40-6D of the tip 64D and are routed, via respective conductors, to the inputs of a multiple position switch 50. The output of the switch is coupled via a conductor to pin B3D of the tip output connector. Depending on the position of the switch, any one of signals PAIS A, PAIS B and PAIS C can be routed to the electronic device. As shown in FIG. 5, the switch may include an additional selection position of GND which is selected for a situation in which an electronic device (having a power input port with a size and shape matching the tip output connector) does not utilize any power adapter identification signal. An end user may be provided with instructions and/or a chart identifying which of the switch positions is correct for a particular (type/brand/model(s) of an) electronic device. The switch may be disposed at a location on the tip, and may be of a type, such that its selection positions can be changed only by the use of a suitable tool so as to avoid unintended repositioning of the switch.

Figure 6:
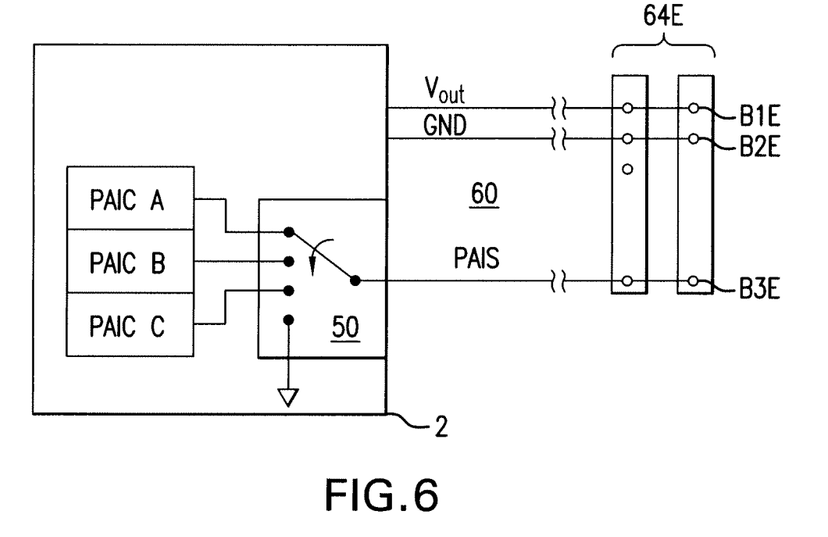
FIG. 6 is a block diagram of an adapter, cable and connector adapter according to an embodiment of the invention.

FIG. 6 is a block diagram of the adapter 2 and a tip 64E according to another embodiment of the invention. In this embodiment, the multiple position switch 50 is disposed on the adapter 2. One of the signals, PAIS A, PAIS B, PAIS C (or GND) as selected by the switch is transmitted, alone with Vout and GND, to the tip 64E via the cable 60. In the absence of remote programming, the cable 60 need have only three wires. Within the tip 64E, $V_{out}$, GND and the selected power adapter identification signal are transmitted via respective conductors from the tip input connector to the tip output connector.

Figure 7:
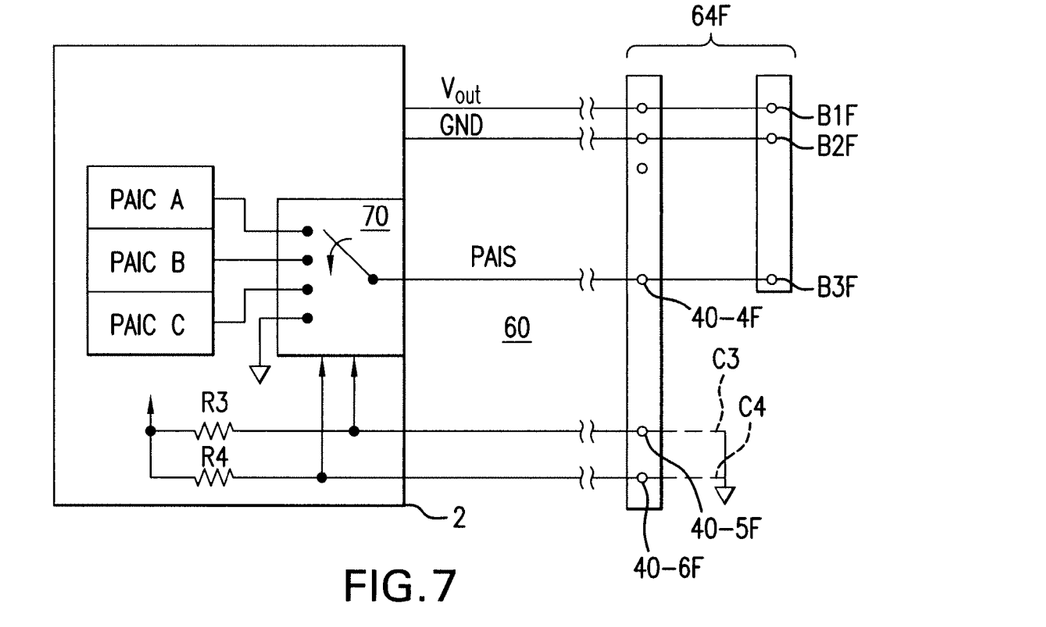
FIG. 7 is a block diagram of an adapter, cable and connector adapter according to an embodiment of the invention.

FIG. 7 is a block diagram of the adapter 2 and a tip 64F according to another embodiment of the invention. In this embodiment, an analog switch 70 or the like is utilized. The signal inputs of the switch are respectively coupled to PAIS A, PAIS B and PAIS C (and GND). The output of the switch is transferred, along with $V_{out}$ and GND, via the cable 60 to the input connector of the tip 64F. The selection position of the switch 70 is determined, for example, by a binary code applied to the control inputs of the switch. For example, a code of "00" selects the GND input, a code of "01" selects PAIS C, a code of "10" selects PAIS B and a code of "11" selects PAIS A. The particular code applied to the switch 70 is determined by the respective voltages on input connector pins 40-5F, 40-6F, which in turn depend on whether conductors C3, C4, within the tip 64F are open-circuited or provide a path to ground. If tip 64F is for use with an electronic device which expects to receive power adapter identification signal B (produced by PAIC B), conductor C4 is cut or otherwise not connected to ground and conducts C3 is connected to ground. With conductor C4 not connected to ground, a pull-up resistor R4 pulls up the most significant bit of the switch control lines to a logic "1". With conductor C3 hard-wired to ground, the least significant bit of the switch control lines is a logic "0" notwithstanding that such control line is also coupled to a pull-up resistor R3. The resulting "10" code selects PAIS B which is produced by PAIC B. In this embodiment of the invention, a selection of which of pins 40-5F, 40-6F are connected to ground is made, along with the selection of the mechanical/electrical configuration of the output connector of the tip 64F, to match a corresponding (type/brand/model(s) of an) electronic device.

In one variation of this embodiment, pins 40-5F, 40-6F are hard-wired to voltages representing a logic "0" and/or a logic "1". The logic "1" voltage may be $V_{out}$ or some voltage derived therefrom. In another variation, a mechanical configuration of the tip is used to set the state of the control inputs to the switch 70. For example, a first tip may have a tab(s) disposed in a certain location while a second tip has a channel disposed in the same location. When a tip is mated to connector 62 (FIG. 3A), the tab pushes a flexible conductor on the connector 62 to close a circuit, while a channel allows the circuit to remain open. In an embodiment of the invention in which a tip is affixed to the distal end of the cable 60, the same tab/channel coding may be used by the connector (on the proximal end of the cable) which detachably mates with a connector on the adapter. Alternatively, the state of the control inputs to the switch may be set by shorting (or not) wires coupled to the control inputs to the ground and/or $V_{out}$ wires within the cable.

Figure 8:
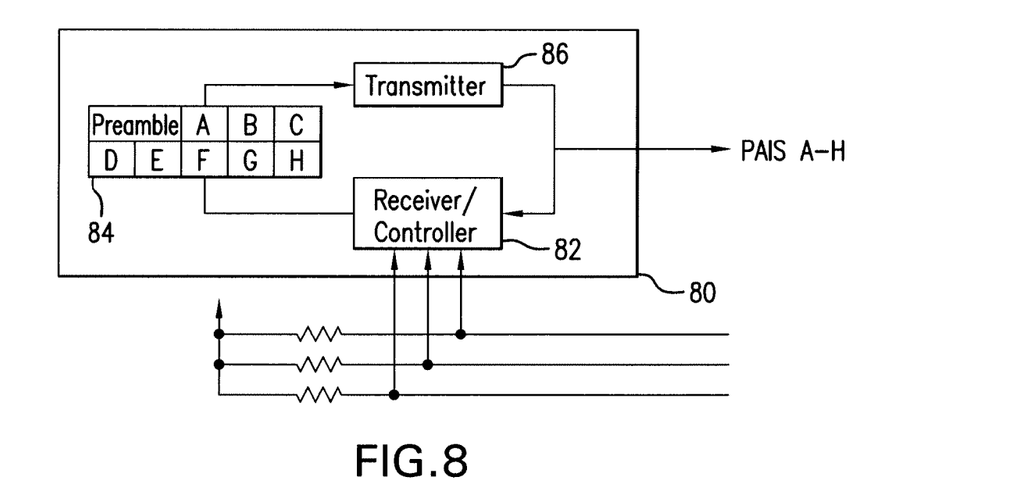
FIG. 8 is a block diagram of a power adapter identification circuit according to an embodiment of the invention.

In the above embodiments of the invention, the respective power adapter identification signals were described as originating from respective power adapter identification circuits in order to explain disparate forms of such signals. In some applications of the invention, the respective forms of the various required power adapter identification signals are similar enough so that they can be generated by a single power adapter identification circuit. FIG. 8 illustrates an example of such a power adapter identification circuit 80. For ease of explanation, it is assumed that the adapter housing the PAIC 80 is intended to power a variety of electronic devices all of which utilize a character string-type PAIS. The memory 84 stores each of the character strings (respectively corresponding to the intended electronic devices) in respective memory locations A-H. The memory may also store a preamble string needed to establish initial communication with the electronic device.

On the assumption that the device manufacturer and the adapter manufacturer are the same, the electronic device send an interrogation request intended to read a predefined location of memory 84 to receive an expected character string residing therein. However, because the adapter is for use with multiple electronic devices, the expected character string most likely does not reside in the predefined memory location, but instead in a memory location determined by the adapter manufacturer. To read the expected character string, the controller performs a memory address translation. That is, the controller translates the address given to it by the electronic device (or defined by the protocol) to the address needed to access the memory location where the appropriate character string actually resides. To perform the address translation, the controller must "know" which particular (type/brand/model of an) electronic device the adapter is currently being used to power. The controller receives this information from a binary code supplied to it by the tip in the manner described above in connection with FIG. 7 or by use of the other applicable power adapter identification signal selection techniques disclosed herein.

While the description above refers to particular embodiments of the present invention, it will be understood that many modifications may be made without departing from the spirit thereof. The accompanying claims are intended to cover such modifications as would fall within the true scope and embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. Power supply equipment, including an adapter and an output connector to power an electronic device, comprising:
    conversion circuitry, within the adapter, to convert power from a power source, external to the adapter, to a DC power for powering the electronic device;
    circuitry, within the adapter, including a memory for storing a plurality of power adapter identification signals; and
    selection circuitry, having a switch responsive to user selection or to a configuration of a cable, connectors or connector adapter electrically coupled to the adapter, to select one of the plurality of power adapter identification signals,
    wherein the output connector has a size, shapes and pin-out configured to detachably mate with a power input port of the electronic device, and receives the DC power and the one selected power adapter identification signal for transfer to the electronic device.

2. The apparatus of claim 1, further comprising a tool, having a first end, for operating the switch, wherein the switch comprises an input configured to detachably mate with the first end of the tool, wherein the input is substantially inaccessible to the user without the tool.

3. The apparatus of claim 1, further comprising a cable having a proximal end and a distal end, wherein the proximal end of the cable is configured to detachably mate with the adapter.

4. The apparatus of claim 3, wherein the distal end of the cable is further configured to detachably mate with the connector adapter.

5. The apparatus of claim 1, wherein each power adapter identification signal identifies a different brand of an electronic device.

6. Power supply equipment, including an adapter and an output connector, comprising:
    conversion circuitry, within the adapter, to convert power from a power source external to the adapter to a DC power for powering an electronic device;
    means for generating a plurality of power adapter identification signals; and
    selection circuitry, having a switch responsive to user selection or to a configuration of a cable, connector, or connector adapter electrically coupled to the adapter, to select one of the plurality of power adapter identification signals, wherein the output connector has a size, shape, and pin-out configured to detachably mate with a power input port of the electronic device, and receives the DC power and the one selected power adapter identification signal for transfer to the electronic device.

\* \* \* \* \*